United States Patent [19]

Czirr

[11] Patent Number: 5,008,067

[45] Date of Patent: Apr. 16, 1991

[54] METHOD OF DOWNHOLE NEUTRON MONITORING

[76] Inventor: John B. Czirr, 1830 E. 400 North, Mapleton, Utah 84663

[21] Appl. No.: 492,395

[22] Filed: Mar. 7, 1990

Related U.S. Application Data

[63] Continuation of Ser. No. 76,508, Jul. 22, 1987, abandoned.

[51] Int. Cl.$^5$ .......................... G01T 3/00; G01V 5/00; G21G 1/06
[52] U.S. Cl. .................................... 376/159; 376/153; 376/166; 250/270; 250/390.01
[58] Field of Search ............... 376/166, 254, 153, 159; 250/270, 390.11, 390.01

[56] References Cited

U.S. PATENT DOCUMENTS

| | | | |
|---|---|---|---|
| 2,799,780 | 7/1957 | Ruderman | 256/390 J |
| 2,842,695 | 7/1958 | Goodman | 250/396 R |
| 3,019,337 | 1/1962 | Fearon et al. | 376/166 |
| 3,034,008 | 5/1962 | Soloway | 250/390 R |
| 3,065,345 | 1/1962 | Leclerc | 376/153 |
| 3,382,363 | 5/1968 | Gant, Jr. et al. | 250/390 J |
| 3,398,278 | 8/1968 | Splichal, Jr. | 250/390 J |
| 3,688,114 | 8/1972 | Youmans | 376/153 |
| 3,688,117 | 8/1972 | Givens | 376/166 |
| 3,710,112 | 1/1973 | Caldwell et al. | 376/166 |
| 3,885,159 | 5/1975 | Jahn et al. | 250/390 J |
| 3,988,586 | 10/1976 | Stuart et al. | 250/390 J |
| 4,090,083 | 5/1978 | Wyrill | 250/390 J |
| 4,268,749 | 5/1981 | Mills, Jr. | 250/390 R |
| 4,454,424 | 6/1984 | Strauss et al. | 250/290 J |
| 4,596,927 | 6/1986 | Hopkinson et al. | 250/270 |
| 4,613,756 | 9/1986 | Iwanczyk et al. | 250/370.11 |

OTHER PUBLICATIONS

"Laminar Scintillators for Fast-Neutron Spectrometry", by Burymov et al., pp. 1295-1298, Translation from Pribory; Tekhnika Eksperimenta, No. 5, pp. 48-51, Sep.-Oct. 1974.

Lewis, V. E. and T. B. Ryves, "Measurement of d+T Neutron Pulses", Nuclear Instruments and Methods in Physics Research, A 257, (1987), 462-466.

*Primary Examiner*—Harvey E. Behrend
*Attorney, Agent, or Firm*—Foley & Lardner

[57] ABSTRACT

A method of downhole neutron monitoring using an oxygen containing scintillating material to generate scintillator light as a function of electrons and gamma rays emitted from the product of the $^{16}O$ (n,p) reaction in a scintillator, converting the generated scintillator light to an electrical signal, and using the electrical signal to record the flux of measured neutrons.

2 Claims, No Drawings

METHOD OF DOWNHOLE NEUTRON MONITORING

This application is a continuation of application Ser. No. 07/076,508, filed July 22, 1987, now abandoned.

BACKGROUND OF THE INVENTION

1. Field of the Invention

This invention relates to the oil exploration industry and particularly to the area of neutron well logging.

2. Prior Art

Nuclear techniques have been extensively applied to the problems of the oil exploration industry, particularly in the area of well logging. Nuclear particle detectors are used to differentiate between strata containing oil, natural gas, water and the type of strata containing these fluids. These investigations estimate the extent of the oil-bearing strata and the amount of oil that these strata contain.

The scientific basis for this survey technique is based on the difference in the neutron reactions of the various materials. The varying reactions are monitored by the detection of gamma rays or neutrons returning from the strata. A probe containing a neutron source is drawn through the bore hole and a detector measures the energy and intensity of the emitted incident particles. Oil, gas, water and various geological formations possess a distinctive gamma ray signature that permit identification of the chemical constituents of the strata.

Two types of neutron sources are now used in the downhole probe. One type employs radioactive sources, such as americium/beryllium or californium, that continuously emit neutrons. The other employs a pulsed 14-MeV neutron generator. Each of these methods has serious drawbacks. The radioactive source requires special licenses in every country in which the source will be used, and must have massive shielding and complicated transportation arrangements. Most importantly, radioactive sources are occasionally lost downhole, which can potentially cause the loss of the hole. The radioactive sources, however, possess the advantage of a well known neutron emission rate.

The pulsed generators are safer to use and allow a wider variety of measurements downhole. The disadvantage of pulsed sources is that they may not emit neutrons at a constant rate.

A high efficiency detector has been proposed for the measurement of short pulses of d+T neutrons. It is based on the activation of sodium in a sodium iodide scintillation detector via the $^{23}$Na (n,$\alpha$) $^{20}$F reaction and the immediately postpulse measurement of the induced beta activity which has an 11 second half life. The detector is insensitive to neutrons with energies below about 7 MeV, and may be calibrated directly against an absolute technique using a "steady current" d+T neutron generator. It is noted that the threshold required is low and encompasses the oxygen background, thereby greatly reducing the usefulness of the method disclosed. V. E. Lewis and T. B. Ryves *Nuclear Instruments and Methods in Physics Research* A 257 (1987) 462–466.

OBJECTS OF THE INVENTION

Principal objects of the present invention are to provide a method of detection of emissions from pulsed neutron generators that is safe to use, accurate and that can be advantageously used for downhole monitoring, i.e., bore hole surveys, activation analysis and source quality control.

Other objects are to provide a method of measuring neutron emission rates that is fast and that will effectively measure varying neutron emission rates from a neutron source drawn through a bore hole with widely varying rock stratas.

Still other objects are to provide a method utilizing an neutron detector that is minimally subject to background distractions and particularly to the large amounts arising from oxygen found in wells and the like.

FEATURES OF THE INVENTION

Principal features of the invention include the use of an oxygen containing scintillating material with a suitable photomultiplier tube to convert generated scintillator light to an electrical signal. The electrical signal is used to record the varying flux of measured neutrons. The measurements are made during beam-off periods to avoid detection of unwanted background events caused by lower energy gamma rays.

Additional objects and features of the invention will become apparent to persons skilled in the art to which the invention pertains from the following detailed description.

DETAILED DESCRIPTION

As previously noted, the movement of probes containing a neutron emitting source through a neutron capturing medium and determination of the nature of the medium by detection of low energy neutrons and of gamma rays released by the medium has been known.

The method of the present invention constitutes an improvement over the known processes in that it utilizes an oxygen containing scintillating material such as bismuth germanate or a lithium glass scintillator as the neutron flux monitor.

The scintillator provides a light signal that is coupled to a suitable conventional photomultiplier tube that will convert the scintillator light to an electrical signal.

The $^{16}$O (n,p) $^{16}$N reaction is used to record the flux of neutrons with energies greater than 11 MeV (the effective threshold) through observation of the decay of $^{16}$N nuclei. This decay occurs with a seven second half life with the emission of high energy electrons and gamma rays. The above seven second half life permits the obtaining of the data during beam-off periods with the consequent reduction in unwanted background events and the emission of high energy electrons and gamma rays which permits the discrimination against lower energy background gamma rays. It is noted that approximately 13% of the $^{16}$N decays results in a combined energy release of 6 MeV or greater. It has been found that the use of an oxygen containing scintillating material permits discrimination against the oxygen background arising from the surrounding media and therefore makes the method very suitable for use in downhole monitoring or where present oxygen may otherwise adversely affect detected data. The same is true for other high energy backgrounds i.e., from $^{11}$B, arising from the surrounding media.

Laboratory tests have been performed to validate the system proposed. The response of the detector system was measured using a Van de Graaff accelerator to produce 14-MeV neutrons. The detector system was placed 20 cm away from the neutron source on a low mass aluminum stand. The detector was irradiated for 30 seconds to establish an equilibrium decay rate for the $^{16}$N produced (4 half lives).

The neutron beam was then turned off and the N decays were counted for 15 sec. This process was repeated several times with the bare detector. The detector was then surrounded by 450 pounds of concrete to simulate the conditions of a bore hole. (The space between the source and detector was left open for the test.) The above irradiation procedure was repeated with the concrete in place and the ratio taken. Table 1 lists this ratio as a function of bias energy for gamma rays interacting in the crystal.

TABLE 1

Bore-Hole Neutron Detector Response

| Bias Energy (MeV) | Concrete in Concrete out | Relative Efficiency |
| --- | --- | --- |
| 3.7 | 1.16 | 1.0 |
| 4.3 | 1.23 | 0.68 |
| 4.9 | 1.26 | 0.54 |
| 5.5 | 1.30 | 0.41 |
| 6.1 | 1.22 | 0.27 |
| 6.7 | 1.05 | 0.15 |
| 7.3 | 0.99 | 0.084 |
| 7.9 | 1.02 | 0.043 |
| 8.5 | 1.18 | 0.022 |
| 9.2 | 1.34 | 0.011 |

It can be seen from the Table that the detector is sufficiently insensitive to changes in the bore hole environment for a bias level between 6.7 and 7.9 MeV.

Although a preferred embodiment of my invention has been disclosed, it is to be understood that the present disclosure is by way of example and that variations are possible without departing from the subject matter coming within the following claims, which subject matter I regard as my invention.

I claim:

1. A method of downhole monitoring neutrons emanating from a pulsed-type neutron source, said neutron source having beam-on and beam-off time periods and positioned in a downhole apparatus comprising the steps of:

(a) using an oxygen containing scintillating material in a detector to monitor neutrons from said neutron source by generating scintillator light as a function of electrons and gamma rays emitted from the product of the $^{16}$O (n,p) reaction, said neutron source emitting neutrons having energies greater than 11 MeV;

(b) positioning said detector in said downhole apparatus and within a borehole surrounded by a formation to be studied;

(c) reducing the effects of background gamma radiation from the $^{16}$O (n,p) reaction occurring in the formation surrounding said detector by:

(1) setting the bias level of said detector to an energy level of at least 6.7 MeV; and (2) after setting the bias level, and during the beam-off time period of said neutron source, measuring the combined energy deposition within said scintillating material from both said electrons and said gammas which equals or exceeds said 6.7 MeV bias level, said scintillating material generating scintillator light corresponding to said combined energy deposition;

(d) converting the generated scintillator light to an electrical signal; and (e) using the electrical signal to record the flux of said neutrons from said neutron source.

2. A method of downhole monitoring neutrons emanating from a pulsed-type neutron source, said neutron source having beam-on and beam-off time periods and positioned in a downhole apparatus comprising the steps of:

(a) using one of bismuth germinate or lithium glass as an oxygen containing scintillating material in a detector to monitor neutrons from said neutron source by generating scintillator light as a function of electrons and gamma rays emitted from the product of the $^{16}$O (n,p) reaction, said neutron source emitting neutrons having energies greater than 11 MeV;

(b) positioning said detector in said downhole apparatus and within a borehole surrounded by a formation to be studied;

(c) reducing the effects of background gamma radiation from the $^{16}$O (n,p) reaction occurring in the formation surrounding said detector by:

(1) setting the bias level of said detector to an energy level of at least 6.7 MeV; and (2) after setting the bias level, and during the beam-off time period of said neutron source, measuring the combined energy deposition within said scintillating material from both said electrons and said gammas which equals or exceeds said 6.7 MeV bias level, said scintillating material generating scintillator light corresponding to said combined energy deposition;

(d) converting the generated scintillator light to an electrical signal; and (e) using the electrical signal to record the flux of said neutrons from said neutron source.

* * * * *